Jan. 5, 1937.  F. A. SMITH  2,067,003
AUTOMOBILE AUXILIARY WINDSHIELD
Filed Dec. 22, 1930  2 Sheets-Sheet 1
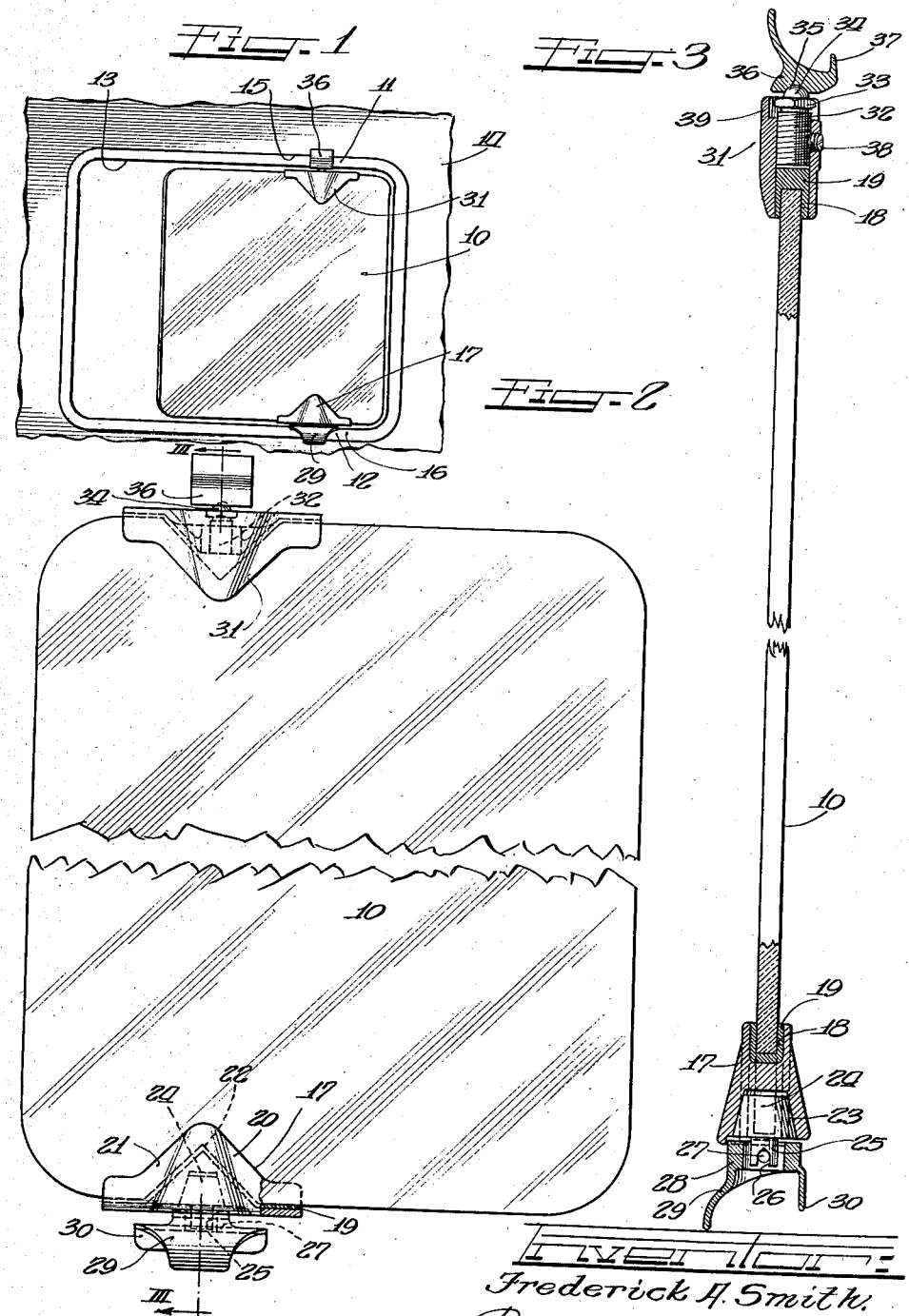
Inventor:
Frederick A. Smith.

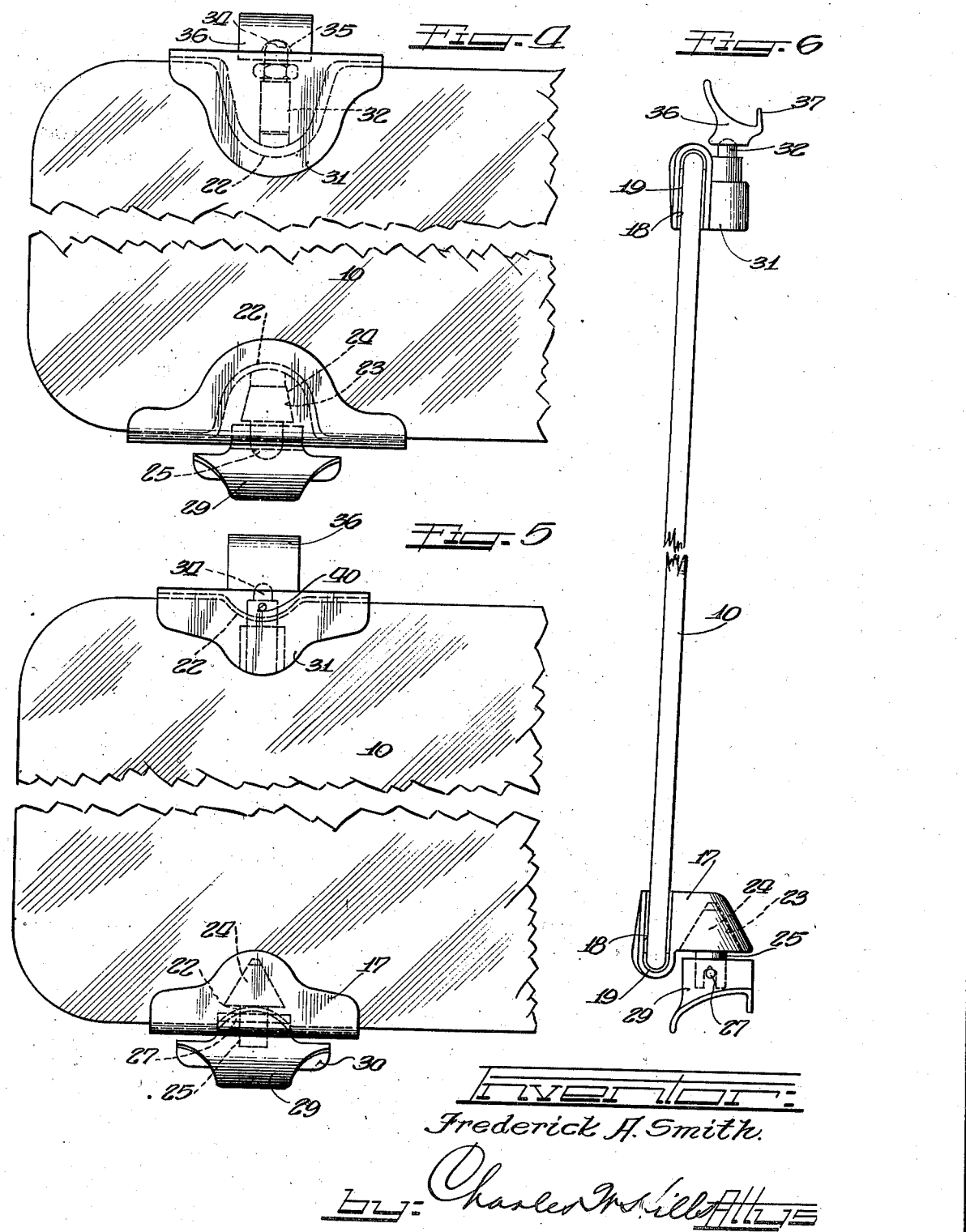

Patented Jan. 5, 1937

2,067,003

UNITED STATES PATENT OFFICE 2,067,003

AUTOMOBILE AUXILIARY WINDSHIELD

Frederick A. Smith, North Chicago, Ill., assignor, by mesne assignments, to Houde Engineering Corporation, Buffalo, N. Y., a corporation of New York Application December 22, 1930, Serial No. 503,931

4 Claims. (Cl. 296—84)

This invention relates to improvements in windshields and more particularly to improvements in the construction and operation of windshields of the auxiliary or window wing type, such as are used in the ventilating of the interior of a moving vehicle and shielding the occupants thereof against drafts and objects floating in the air.

In the past these auxiliary windshields have, in the main, comprised a transparent shield pivotally supported on upper and lower brackets secured respectively to the upper and lower reveals of the side windows of the vehicle. While the supporting brackets of some of the devices now in use have been rigidly attached by means of screws to the outside surface of the window frame and others have been pivotally connected to pads which were secured as by screws to the surface of the reveals, such modes of attachment are objectionable in that they necessitate the undesirable marring of the car finish. In an endeavor to overcome this objection, other types of these prior structures have utilized a spreader rod having pads at the opposite ends thereof for engagement with the upper and lower reveals of the window, and means for extending the spreader rod in order to force the pads against the reveals and frictionally hold them against displacement. Moreover, in this type of structure, the transparent shield is usually supported by pivotally mounted offset brackets and, although this type of structure proved advantageous in that it prevented marring of the car finish, it was objectionable in that the spreader rod prevented a clear and unobstructed view through the shield.

In order to overcome the above noted and other objections to the prior art devices, it is an object of the present invention to provide an auxiliary windshield arranged for securing to the reveals of the side windows of a vehicle which includes improved supporting means that are so disposed relative to the shield that pressure will be exerted substantially on a center line of the shield, thereby making it unnecessary to employ spreader rods and the like for forcing the pads into frictional engagement with the reveals of the window.

It is a further object of this invention to provide an improved windshield including novel means for securing it to the reveals of the side windows of a vehicle in such a manner that it will not mar or disfigure the vehicle finish.

Another object of the invention is to provide in a windshield improved means for securing it to the reveals of the side windows of a vehicle, the securing means being adapted for frictionally holding the shield in operative position and designed so as not to obstruct the view of the occupants of vehicle.

A still further object of my invention is the provision of an improved pivotal mounting for an auxiliary windshield including means which may, by a simple adjustment, be actuated into frictional engagement with the reveals of the vehicle window, this adjustment also automatically applying the proper frictional resistance for opposing pivotal movement of the shield, whereby the shield will be held in any desired angular position of adjustment about its axis of rotation.

It is also an object of this invention to provide an extremely simple, compact, durable, and efficient ventilation appliance for enclosed vehicles and the like, which may be quickly and conveniently applied and readily manipulated, and removed without damaging or marring of the vehicle finish, and which is so designed that it cannot be removed when the associated window is in closed position.

In accordance with the general features of my invention, I propose to provide a plate of transparent material and secure supporting brackets to the lateral edges thereof, these brackets having pads detachably connected thereto for engaging the surfaces of the upper and lower reveals of the side window of a vehicle. Each bracket is pivotally associated with the pad adjacent thereto, the pivots thus provided at the opposed edges of the transparent plate being so disposed that their center lines will be substantially in alignment and pass through the center line of the transparent plate. Further, one of the pivotal connections is provided with surfaces in frictional engagement, which are so arranged that, when the pressure against the pads is adjusted, the frictional resistance opposing the rotation of the transparent plate about its pivotal mounting is automatically and simultaneously set at the proper value, this resistance being determined by the amount of pressure upon the pads.

Other objects and advantages of my invention will more fully appear from the following detail description taken in connection with the accompanying drawings, which illustrate several embodiments thereof, and in which:

Figure 1 is a fragmentary elevation showing one of the side windows of an automobile having an auxiliary windshield embodying the features of my invention secured to the top and bottom reveals thereof;

Figure 2 is an enlarged fragmentary elevation showing the operative relationship of the instrumentalities comprising my invention;

Figure 3 is a transverse sectional view through the windshield, taken substantially on line III—III of Figure 2;

Figure 4 is an enlarged fragmentary elevation showing a modified form of my invention in which the pivotal mounting is offset from the plane of the transparent shield;

Figure 5 is a fragmentary elevation showing another modification of my invention in which the pivotal mountings are offset from the plane of the transparent plate and in which a slightly different form of pivot member has been used; and Figure 6 is an end elevation of the modified form of my invention as shown in Figure 5, wherein the operative relationship of the component parts is illustrated.

As shown on the drawings:

My improved windshield comprises in general as shown in Figure 1 a substantially rectangular transparent deflector shield 10, which is preferably formed of plate glass and supported by upper and lower supporting members which are generally indicated at 11 and 12, and serve to support the shield for rotation about its vertical axis for movement through a window opening 13 of the vehicle side 14. The supporting members 11 and 12 are formed for engaging the upper and lower reveals 15 and 16 respectively of the windows.

The lower supporting member 12 comprises a bracket member 17 having a groove 18 in its upper edge for receiving the lower edge of the deflector shield 10 therein. The shield is cushioned within this groove by a channel-shaped shim 19 which is disposed between the glass and the walls of the groove and extends throughout the length thereof. It will be observed that this groove is distorted upwardly intermediate its ends to form downwardly diverging portions 20 and 21 and that the shield is provided with a notch or cut-out portion 22 which conforms to the bottom of the groove and provides suitable clearance for a conical shaped socket 23 which opens into the lower edge of the bracket for receiving a pivot pin 24 having its surface conformed for frictional engagement with the wall of the conical socket. The pivot pin 24 is provided with a central shank or stem 25 which projects from the lower surface thereof and is notched at its lower end as shown at 26 for straddling a pivot pin 27 which is supported at its ends in an annular boss 28 formed on the upper surface of a lower pad member 29. The inner wall of the boss 28 is sufficiently spaced from the outer surface of the shank 25 to permit limited rotation or tilting of the shank about pin 27. The lower surface of pad member 29 is shaped to conform to the surface of the lower reveal 16 of the vehicle window and is provided with a depending flange 30 which is adapted to fit over and embrace the inner edge of the reveal.

The upper support 11 comprises a bracket 31 having a groove in its lower edge which is similar to that in the lower bracket 17 and is secured to the glass in the same manner as described for the lower bracket. The upper bracket 31 has an adjusting screw 32 which is threaded so as to be longitudinally movable relative to the bracket. This screw is provided with a polygonal portion 33 for receiving a wrench thereover to facilitate the adjustment of the screw. The upper end of the screw 32 terminates in a ball point 34 which is adapted to be seated in a recess 35 in the lower surface of a pad member 36 having its upper surface conformed to engage the surface of the upper reveal 15 of the window and having an upwardly deflected flange 37 for embracing the inner edge of the upper reveal in the same manner as in the lower pad. A set screw 38 is threadedly associated with the bracket 31 and disposed so as to be tightened against the adjusting screw 32 for holding it in adjusted position. A flange or projecting portion 39 is formed on one side of the bracket 31, which extends upwardly towards the associated pad 36 past the polygonal portion 33 to prevent the actuation of the adjusting screw 32 from the outside of the vehicle, thereby preventing unauthorized removal of the auxiliary windshield when the window within the frame 13 is in closed position.

It will be observed in the structure just described that the center line of the shield 10 passes through the vertical center line of the brackets 17 and 31, the adjusting screw 32, the pivot pin 24 and the pivot pin 27. In other words the brackets 17 and 31 are symmetrically disposed on each side of the vertical center line of the shield 10 so that any pressure which is applied to the glass through the supporting brackets 17 and 31 will pass through the center line of the glass, thereby subjecting the shield to compressional forces only.

In Figures 4, 5, and 6, I have shown modified forms of my improved auxiliary windshield and have denoted by corresponding reference numerals the component parts therein which are similar to those as described in the preferred form of my invention. These modifications differ from the preferred form mainly in that the pivotal axis of the deflected shield is offset from the center line through the shield. This arrangement is advantageous in that it permits a greater clearance between the shield and the window. It will be observed that, even in this form of my invention, the major forces exerted upon the shield will be compressional forces and that there will therefore be little danger of causing breakage of the shield. In Figure 5, it will be noted that the polygonal portion of the upper adjusting screw 32 has been replaced by a socket 40 which is adapted to receive a pointed tool therein which may be used to adjust the screw. Further, in the preferred form of my device, a triangular notch 22 is formed in the glass where it engages with the upper and lower bracket whereas in the modified forms, notches of various curvatures have been shown. These notches may be of any shape so long as they prevent longitudinal movement of the shield through the groove of the bracket and provide sufficient clearance for the pivot pins.

In the application of my improved auxiliary windshield to the window of a vehicle, the lower pad 29 is placed on the lower reveal of the window in the position where it is desired to have the shield located, with the flange 30 embracing the inner edge of the reveal. The pivot member 24 is then disposed within the annular boss 28 with the notch 26 straddling the pivot pin 27. The lower bracket is then disposed so that the pivot pin 24 will be within the socket 23 thereof. The upper pad is placed in engagement with the upper reveal of the window in the same manner as in the case of the lower pad, and the ball point 34 is aligned with the socket 35 of the upper pad. The adjusting screw is now manipulated so as to move the ball point into the socket 35 and press the upper pad and lower pad firmly against their associated reveals. This action also automatically sets the surfaces of the pivot pin 24 and the wall of the socket 23 so that frictional resistance or drag will be applied against rotational movement of the shield. When the desired amount of friction is secured, the set screw 38 is tightened against the adjusting pin.

It will, therefore, be evident from the above that the windshield of my invention is very easily installed and that by providing the pivot pin 24 with shanks of various lengths and also by providing adjusting screws 32 of various lengths, a given sized windshield may be easily adapted for mounting in window frames of various sizes. Since the pads are frictionally held in engagement with the window reveals, the finish of the car will not be marred as in the type using screws and other securing means which pierce the window reveals. The pivotal mounting of the shield being arranged so that the axis of rotation is through the shield or substantially therethrough, the shield will be subjected to compressional stresses with the result that the likelihood of the shield becoming broken is reduced to a minimum. The shield embodying my invention also permits a view therethrough which is not obstructed by solid members which extend across the face thereof and a shield which cannot be removed or stolen when the window in the windowframe is in closed position.

Now it is, of course, to be understood that although I have illustrated and described in detail several embodiments of this invention, the invention is not to be thus limited, but only insofar as defined by the scope and spirit of the appended claims.

I claim as my invention:

1. In a windshield including a rotatably mounted deflector, a pad having a tubular portion, a pin pivotally associated with said deflector and having an end extending into said tubular portion, said end having a transverse slot therein, and a member supported in said tubular portion and extending into said slot for holding said pin against rotational movement.

2. In a windshield including a rotatably mounted deflector, a bracket secured to said deflector, having a conical shaped socket, a tiltable pivot pin having a conical surface for engagement with the wall of said socket, and means for adjusting the contact pressure between said surface and wall to vary the frictional resistance opposing rotation of the deflector.

3. In a windshield including a rotatably mounted deflector, a bracket secured to said deflector having a conical shaped socket, a pivot pin having a conical surface for engagement with the wall of said socket, a pad disposed adjacent said bracket, means for hingedly connecting said pin to said pad, and means for adjusting the contact pressure between said surface and wall to vary the frictional resistance opposing rotation of the deflector.

4. In a windshield including a rotatably mounted deflector, a bracket secured to said deflector having a conical shaped socket, a pivot pin having a shank formed thereon and a conical surface for engagement with the wall of said socket, a pad disposed adjacent said bracket, a tubular portion formed on said pad and surrounding said shank, a pin extending through said shank and tubular portion, and means for adjusting the contact pressure between said surface and the wall of said socket to vary the frictional resistance opposing rotation of the deflector.

FREDERICK A. SMITH.